United States Patent
Harasaki et al.

(10) Patent No.: US 6,674,753 B1
(45) Date of Patent: Jan. 6, 2004

(54) SWITCHING APPARATUS OF TIME DIVISION MULTIPLEXING SYSTEM FOR CONTROLLING DATA TRANSMISSION THROUGH MESSAGE MEMORY SHARED BETWEEN PLURAL CHANNELS, METHOD FOR DATA TRANSMISSION AND INFORMATION STORAGE MEDIUM FOR THE METHOD

(75) Inventors: Kazuhiko Harasaki, Tokyo (JP); Hideyuki Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/349,961

(22) Filed: Jul. 9, 1999

(30) Foreign Application Priority Data

Jul. 10, 1998 (JP) .......................... 10-210299

(51) Int. Cl.$^7$ .............................. H04L 12/50
(52) U.S. Cl. .................. 370/378; 370/381; 370/395.7; 370/412; 370/428
(58) Field of Search ................. 370/360, 363, 370/368, 371, 374, 375, 378, 379, 381, 382, 383, 395.7, 395.71, 395.72, 412, 413, 428, 429, 389, 422

(56) References Cited

U.S. PATENT DOCUMENTS

| | | | | |
|---|---|---|---|---|
| 5,146,772 A | | 9/1992 | Hamada et al. | |
| 5,475,679 A | * | 12/1995 | Munter | ........................ 370/395 |
| 5,583,861 A | * | 12/1996 | Holden | ........................ 370/395 |
| 5,663,961 A | * | 9/1997 | McRoberts et al. | ......... 370/412 |
| 5,831,980 A | * | 11/1998 | Varma et al. | ................ 370/395 |
| 5,859,849 A | * | 1/1999 | Parks | ........................... 370/395 |
| 5,959,993 A | * | 9/1999 | Varma et al. | ................ 370/397 |
| 6,031,842 A | * | 2/2000 | Trevitt et al. | ................ 370/412 |
| 6,034,945 A | * | 3/2000 | Hughes et al. | ............... 370/230 |
| 6,052,376 A | * | 4/2000 | Wills | ........................... 370/419 |
| 6,055,235 A | * | 4/2000 | Blanc et al. | ................. 370/389 |
| 6,295,299 B1 | * | 9/2001 | Haddock et al. | ............ 370/423 |
| 6,335,932 B2 | * | 1/2002 | Kadambi et al. | ............ 370/391 |
| 6,456,590 B1 | * | 9/2002 | Ren et al. | .................... 370/229 |

FOREIGN PATENT DOCUMENTS

| | | |
|---|---|---|
| JP | 61-236297 | 10/1986 |
| JP | 63-37754 | 2/1988 |
| JP | 64-46398 | 2/1989 |
| JP | 3-188796 | 8/1991 |
| JP | 4-239254 | 8/1992 |
| JP | 7-154883 | 6/1995 |
| JP | 9-168057 | 6/1997 |

* cited by examiner

Primary Examiner—Chi Pham
Assistant Examiner—Anh Vu Ly
(74) Attorney, Agent, or Firm—Foley & Lardner

(57) ABSTRACT

A switching apparatus incorporated in a time division multiplying system has a read control memory for storing addresses indicative of parts of different messages to be transferred to different channels, and a read controller checks the read control memory so as to determine the memory areas of a message memory for selectively transferring the parts of different messages to the channels, thereby making the memory structure simple.

13 Claims, 4 Drawing Sheets

SWITCHING APPARATUS OF TIME DIVISION MULTIPLEXING SYSTEM FOR CONTROLLING DATA TRANSMISSION THROUGH MESSAGE MEMORY SHARED BETWEEN PLURAL CHANNELS, METHOD FOR DATA TRANSMISSION AND INFORMATION STORAGE MEDIUM FOR THE METHOD

FIELD OF THE INVENTION

This invention relates a to a time division multiplexing system and, more particularly, to a switching apparatus incorporated in the time division multiplexing system for controlling the data transmission, a method for controlling the data transmission and an information storage medium storing a program sequence for the method.

DESCRIPTION OF THE RELATED ART

Conventionally, the switching apparatus is connected to a message line, and messages are transferred from the switching apparatus to the message line through a time division multiplexing. Time on the message line is divided into frames, and each frame is further divided into time slots. A time slot starts at a certain timing in one of the frames, and forms a channel together with the time slots at the same timing in the other frames. The messages are not constant in length. A message may require the time slots different from those to be required for another message. The message is divided into pieces, and the pieces of message are assigned to the time slots of a channel.

The prior art switching apparatus includes message memories for storing the messages and message transmitters for delivering the messages to the channels. Each of the message memories is exclusively used for one of the channels, and the message transmitters are also assigned the channels, respectively. Thus, the prior art switching apparatus requires plural combinations of the message memories and the message transmitters equal in number to the channels. This feature is uneconomical. The message memories and the message transmitters increase the production cost of the prior art switching apparatus. Thus, a problem inherent in the prior art switching apparatus is the high production cost.

SUMMARY OF THE INVENTION

It is therefore an important object of the present invention to provide a switching apparatus, which is low in production cost.

It is also an important object of the present invention to provide a method for transferring messages in a time division multiplexing fashion which is repeated in the switching apparatus.

It is also an important object of the present invention to provide an information storage medium for readably storing programmed instructions for the method.

To accomplish the object, the present invention proposes to share a message memory between channels.

In accordance with one aspect of the present invention, there is provided a switching apparatus for supplying pieces of data information to plural channels defined on a data line through a time division multiplexing comprising a first memory having first memory areas storing first pieces of data information to be selectively transferred to the plural channels and responsive to a first address signal for selectively outputting the first pieces of data information, a second memory having second memory areas storing second pieces of data information to be selectively transferred to the plural channels and responsive to a second address signal for selectively outputting the second pieces of data information, a selector connected between the first and second memories and the data line and responsive to a control signal so as to selectively transfer the first pieces of data information and the second pieces of data information to the plural channels, a channel controller including a third memory having third memory areas associated to the plural channels, respectively, and storing pieces of address information each assigned to one of the first memory areas for storing one of the first pieces of data information to be transferred to associated one of the plural channels or one of the second memory areas for storing one of the second pieces of data information to be transferred to the associated one of the plural channels together with first pieces of flag information each used for controlling the data transfer from the first and second memories to associated one of the plural channels and a controller connected to the first memory, the second memory, the third memory and the selector, and sequentially accessing the third memory areas for controlling the data transfer from the first and second memories through the selector to the output line with the control signal, the first address signal and the second address signal.

In accordance with another aspect of the present invention, there is provided a method for transferring pieces of data information to plural channels through a time division multiplexing comprising the steps of a) storing first pieces of data information, second pieces of data information and plural combinations of pieces of address information and first pieces of flag information in first memory areas of a first memory, second memory areas of a second memory and third memory areas of a third memory, respectively, b) deciding a timing to be given for a data transfer to one of the plural channels, c) checking one of the third memory areas assigned to the aforesaid one of the plural channels to see whether the first piece of flag information is indicative of a data transfer from the first memory to the aforesaid one of the plural channels or from the second memory to the aforesaid one of the plural channels and d) instructing either first memory or second memory to transfer one of the first pieces of data information or one of the second pieces of data information to the aforesaid one of the plural channels.

In accordance with yet another aspect of the present invention, there is provided an information storage medium for storing a set of programmed instructions representative of a method for transferring pieces of data information to plural channels through a time division multiplexing comprising the steps of a) storing first pieces of data information, second pieces of data information and plural combinations of pieces of address information and first pieces of flag information in first memory areas of a first memory, second memory areas of a second memory and third memory areas of a third memory, respectively, b) deciding a timing to be given for a data transfer to one of the plural channels, c) checking one of the third memory areas assigned to the aforesaid one of the plural channels to see whether the first piece of flag information is indicative of a data transfer from the first memory to the aforesaid one of the plural channels or from the second memory to the aforesaid one of the plural channels and d) instructing either first memory or second memory to transfer one of the first pieces of data information or one of the second pieces of data information to the aforesaid one of the plural channels.

BRIEF DESCRIPTION OF THE DRAWINGS

The features and advantages of the switching apparatus, the method and the information storage medium will be more clearly understood from the following description taken in conjunction with the accompanying drawings in which:

FIG. 2 is a view showing plural memory areas defined in a switch buffer 1a;

DESCRIPTION OF THE PREFERRED EMBODIMENT

Figure 1:
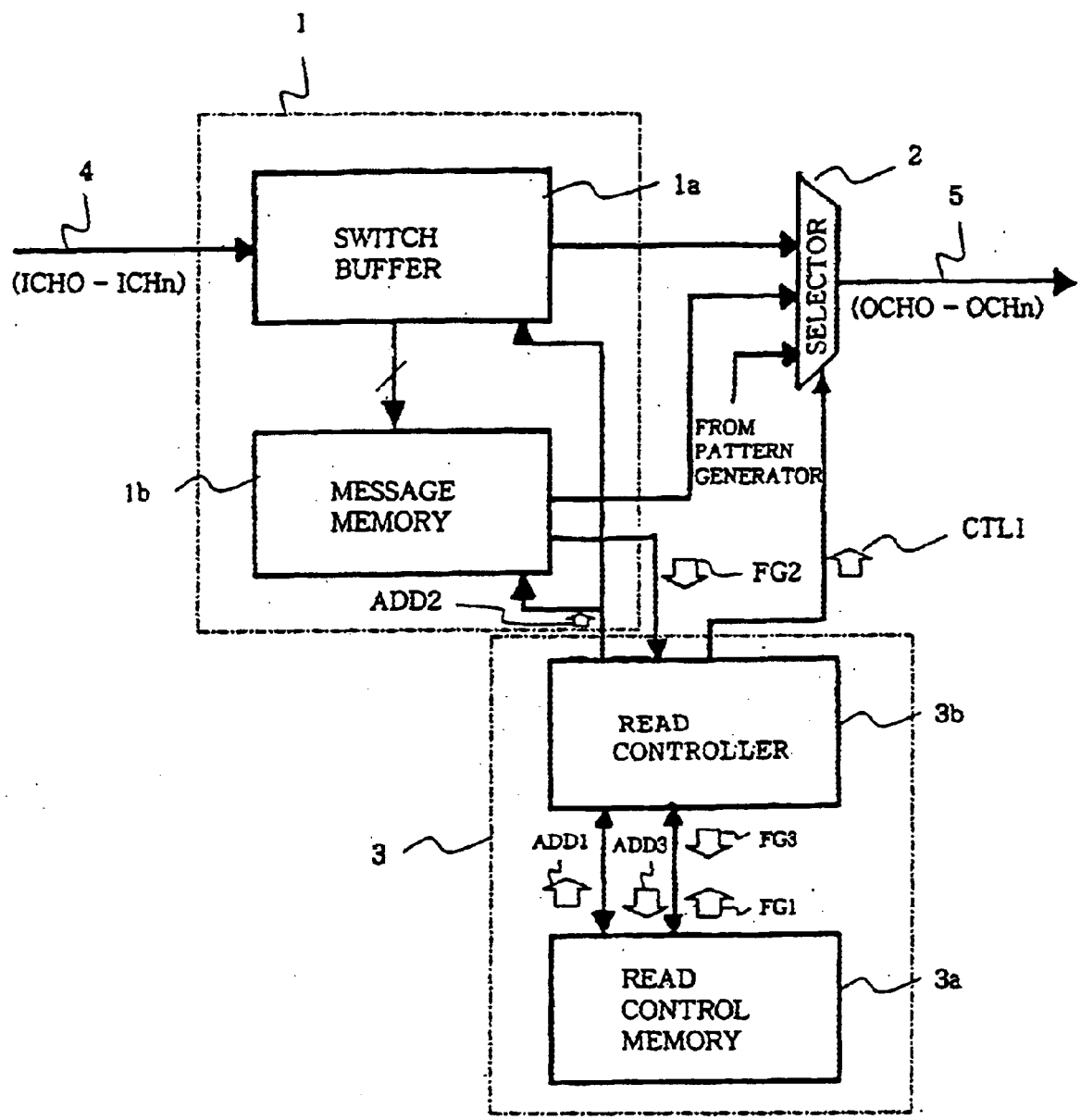
FIG. 1 is a block diagram showing the arrangement of a switching apparatus incorporated in a time division multiplexing system according to the present invention.

Referring to FIG. 1 of the drawings, a switching apparatus embodying the present invention largely comprises a memory unit 1, a data transmitter 2 and a channel controller 3. The switching apparatus is incorporated in a time division multiplexing system. An input message line 4 is connected to the memory unit 1, and the data transmitter 2 is connected to an output message line 5. Input channels and output channels are respectively defined on the input message line 4 and the output message line 5 as similar to the prior art. The input channels are respectively assigned to different messages, and each of the messages is represented by an input data byte or input data bytes. Similarly, the output channels are respectively assigned to the messages, and one of the output messages is represented by output data bytes. The messages are temporarily stored in the memory unit 1, and are delivered from the data transmitter 2 to the output channels under the control of the channel controller 3. In this instance, the input message line 4 and the output message line 5 are assumed to have n+1 input channels ICH0–ICHn and n+1 output channels OCH0–OCHn, respectively.

Figure 2:
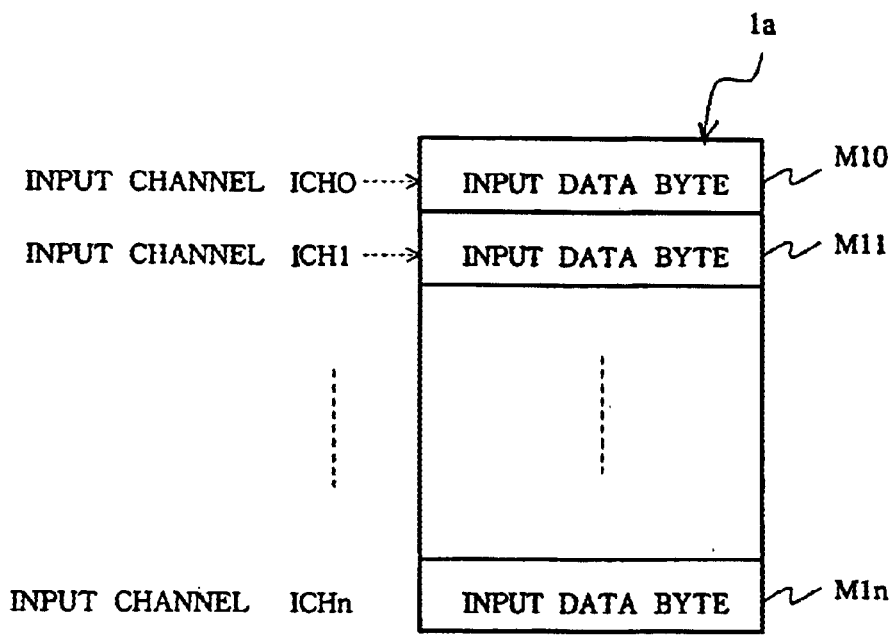

The memory unit 1 includes a switch buffer 1a and a message memory 1b. Plural addressable memory areas M10/M11/ . . . /M1n are defined in the switch buffer 1a, and are assigned to the input data bytes transferred through the input channels ICH0–ICHn, respectively, as shown in FIG. 2. The data bytes stored in the addressable memory areas M10–M1n are representative of pieces of different messages "0"–"n".

Figure 3:
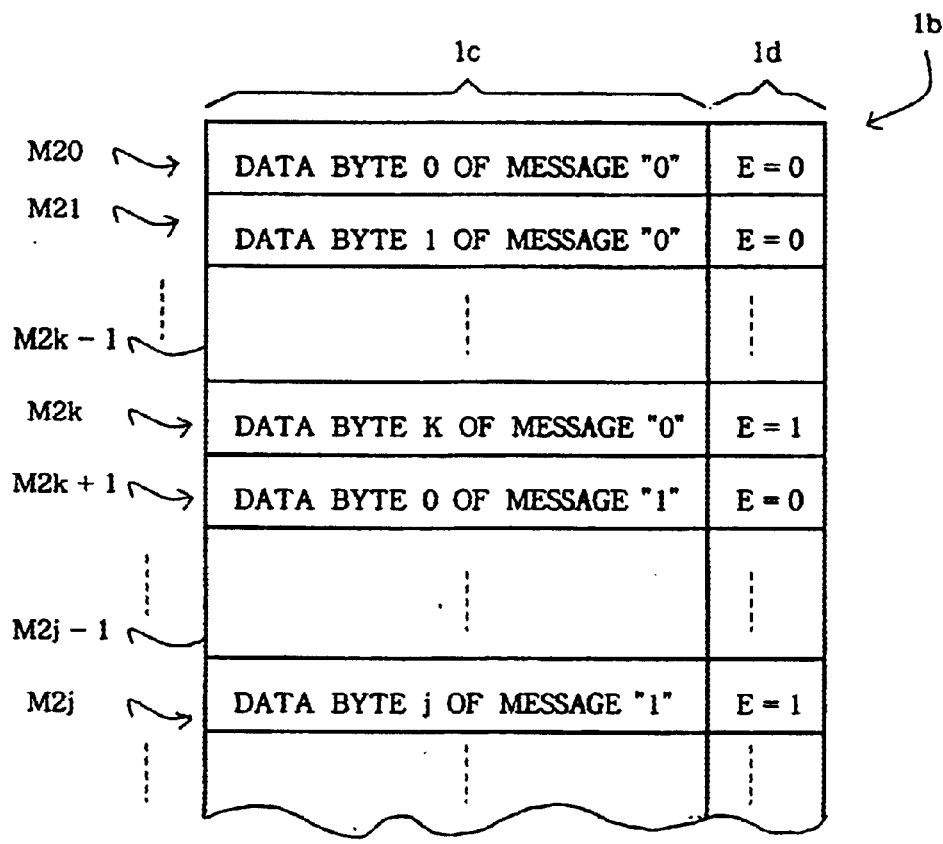
FIG. 3 is a view showing plural memory areas defined in a message memory unit.

The message memory 1b includes plural addressable memory areas M20/M21/ . . . /M2k/2K+1/ . . . /M2j/ . . . , and each addressable memory areas has a data sub-area 1c assigned to the data byte representative of a piece of message and a flag sub-area 1d assigned to an end flag bit E representative of the final data byte of a message as shown in FIG. 3. If the data byte is non-final, the end flag bit E is "0". When a final data byte is stored, the final data byte is labeled with the end flag bit E of "1". The input channels ICH0/ICH1 are assumed to supply message "0" represented by k+1 data bytes and the message "1" represented by j+1 data bytes to the memory unit 1. The data byte 0 to the data byte k are respectively stored in the memory areas M20–M2k, and data byte 0 to the data byte j are respectively stored in the memory areas M2k+1–M2j. The data bytes 0 to k−1 representative of the pieces of message "0" are non-final, and the end flag bit E is "0". However, the data byte k is representative of the final piece of the message "0", and is labeled with the end flag bit E of "1". Similarly, the data bytes 0 to j−1 are non-final, and are labeled with the end flag bit E "0". The data byte j is the final byte for the message "1", and is labeled with the end flag bit E "1". Thus, the final data bytes of the messages are discriminative with the end flag bit E of "1".

If the data bytes are not transferred from the switch buffer 1a through the data transmitter 2 to the output message line 5, they are supplied to the message memory 1b upon completion of each frame, and are written into the message memory 1b under the control of a controller (not shown) incorporated in the switching apparatus. As a result, the message memory 1b stores the data bytes of a message or messages not delivered to the output message line 5 yet.

The data transmitter 2 is implemented by a selector, and the selector 2 is connected to three data sources, i.e., the switch buffer 1a, the message memory 1b and a pattern generator (not shown). The pattern generator supplies a data byte representative of an idling pattern to the selector 2. The selector 2 is responsive to a control signal CTL1 so as to selectively transfer the data byte from the three data sources to the output message line 5.

Figure 4:
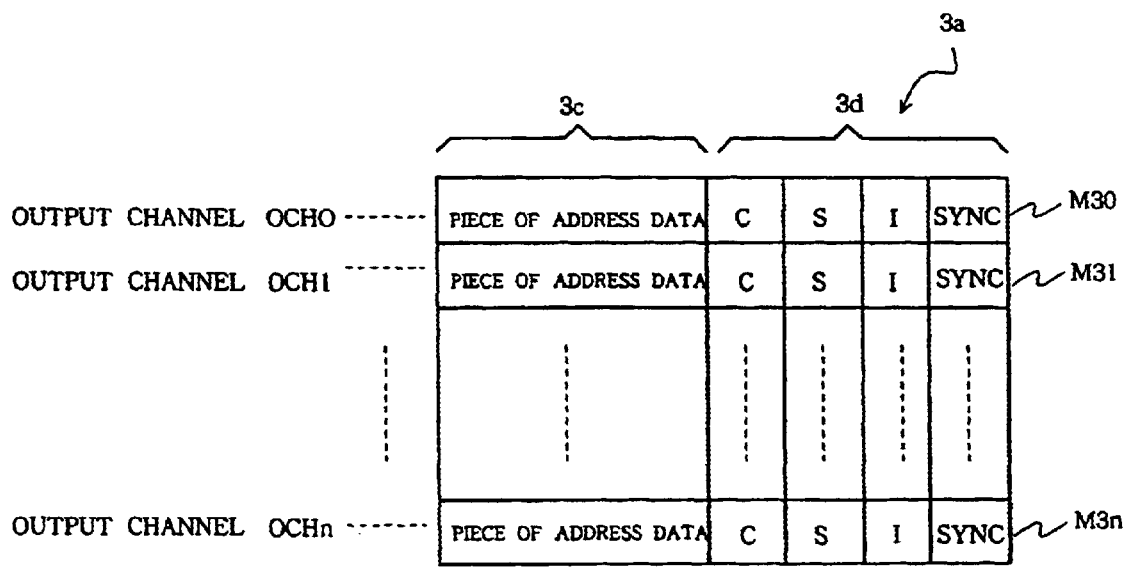
FIG. 4 is a view showing plural memory areas defined in a read control memory.

Turning back to FIG. 1, the channel controller 3 includes a read control memory 3a and a read controller 3b. The read control memory 3a includes plural memory areas M30–M3n as shown in FIG. 4. The memory areas M30–M3n are respectively assigned to the output channels OCH0–OCHn, and are divided into a data sub-area 3c and a flag sub-area 3d. Pieces of address data are stored in the data sub-area 3c, and flag bits C/S/I/SYNC are stored in the flag sub-area 3d. Each piece of address data is indicative of an address assigned to one of the memory areas M10–M1n or a memory area for storing the origin of the message such as, for example, the data byte 0 of the message "0".

The flag bit C is indicative of the permission to access the message memory 1b or the prohibition from the access to the message memory 1b.

The flag bit S is indicative of whether the data byte or bytes stored in the message memory 1b are valid or invalid. If the flag bit S is "1", the data bytes in the message memory 1b are valid, and the message has not been delivered to the output channel, yet. On the other hand, if the final data byte is delivered to the output channel, the flag bit S is changed to "0".

The flag bit I is indicative of the idling pattern to be delivered to the output channel. If the flag bit I is "1", the read controller 3b produces the control signal CTL1 indicative of the idling pattern, and supplies the control signal CTL1 to the selector 2. This means that the read controller 3b selects the switch buffer 1a on the basis of the remaining combination of the flag bits S and I, i.e., S=0 and I=0. In this instance, the flag bit S has the priority to the flag bit I as will be described hereinlater.

Although the flag bit SYNC is not used in this instance, the flag bit SYNC is changed between an active level and an inactive level. When the flag bit SYNC is in the active level, the read controller 3b is requested to make the data transfer in synchronism with an external signal. In other words, the read controller 3b ignores the flag bit C until the external signal is changed to active.

The read controller 3b accesses the read control memory 3a in synchronism with the time slots in each frame, and sequentially fetches the pieces of address data and the flag bits C/S/I from the memory areas M30–M3n for transferring the data bytes to the time slots of the output channels OCH0–OCHn. The pieces of address data and the flag bits C/S/I are supplied from the read control memory 3a through an address signal ADD1 and a flag signal FG1 to the read controller 3b. The read controller 3b selectively enables the switch buffer 1a and the message memory 1b, and supplies the address signal ADD1 to selected one of the switch buffer 1a and the message memory 1b. The read controller 3b gives the control signal CTL1 a value representative of one of the three data sources, and causes the selector 2 to connect the selected data source to the output message line 5. The read controller 3b fetches the end flag bit E from the message memory 1b, and increments the address by one. The read controller 3b writes the new address into the read control memory 3a through an address signal ADD3. The read controller 3b fetches the end flag bit E through a flag signal FG2 to see whether the data transmission for a message is completed or not. When the data transmission is completed, the read controller 3b changes the flag bit S through a flag signal FG3.

Figure 5:
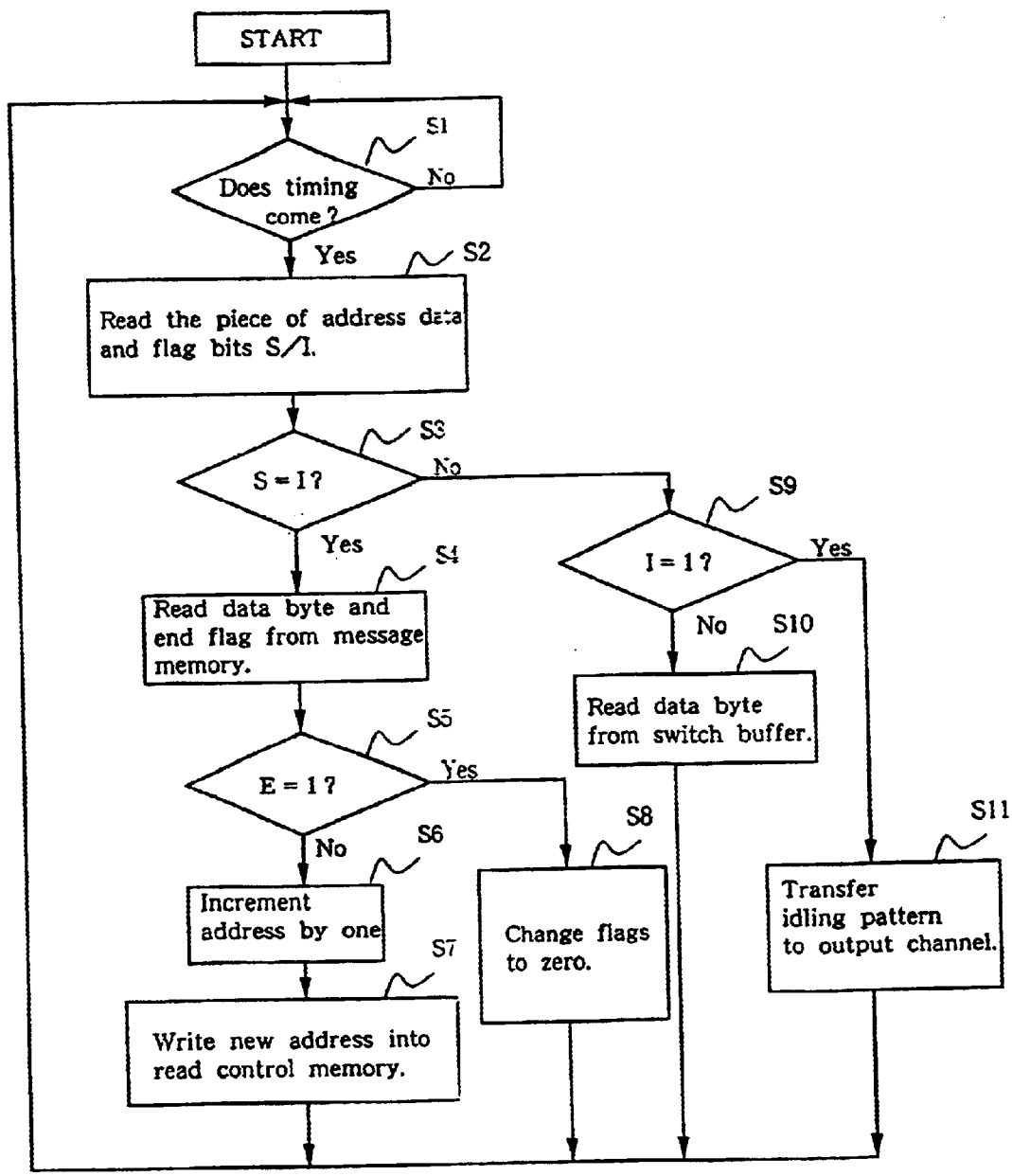
FIG. 5 is a flow chart showing a program sequence executed by a read controller incorporated in the switching apparatus.

The read controller 3b repeats a program sequence shown in FIG. 5 so as to deliver the data bytes representative of the messages "0"–"n" to the output channels OCH0–OCHn. In other words, the read controller 3b once executes the program sequence for one of the output channel, and repeats it for the other output channels. In the following description, the read controller 3b is assumed to execute the program sequence for the output channel OCH0. In order to make the description simple, the data transmission is described as if all the data bytes 0 to k are transferred to the output channel 0 without any interruption.

The read controller 3b checks the time to see whether or not the timing for the output channel OCH0 comes as by step S1. If the answer at step S1 is given negative, the read controller 3b waits for the timing by repeating the step S1. When the timing for the output channel OCH0 comes, the answer at step S1 is changed to affirmative, and the read controller 3b proceeds to step S2.

The read controller 3b accesses the memory area M30 at step S2, and reads out the piece of address data and the flag bits S/I from the memory area M30 through an address signal ADD2 and a flag signal FG1. The read controller 3b checks the flag bit S to see whether the message "0" in the message memory 1b is valid or invalid as by step S3. If the flag bit S is "1", the message "0" is valid, and the answer at step S3 is given affirmative. Then, the read controller 3b makes the message memory 1b accessible, and supplies the address signal ADD2 indicative of the head address of the memory area 20 to the message memory 1b. The read controller 3b supplies the control signal CTL1 indicative of the message memory 1b to the selector 2, and the selector 2 becomes ready for transferring the data byte from the message memory 1b to the output channel OCH0. The message memory 1b is responsive to the address signal ADD2 so as to supply the data byte 0 and the end flag bit E "0" to the selector 2 and the read controller 3b, respectively, as by step S4. The data byte 0 is transferred to the output channel OCH0. The end flag bit E is transferred from the message memory 1b to the read controller 3b through the flag signal FG2.

The read controller checks the end flag bit E to see whether the read-out data byte is final or non-final as by step S5. The data byte 0 is labeled with the end flag bit E "0", and the end flag bit E "0" indicates that the data byte 0 is non-final. Then, the answer at step S5 is given negative, and the read controller 3b increments the address represented by the piece of address data as by step S6. The read controller 3b writes the piece of address data representative of the new address into the memory area M30 through the address signal ADD3 as by step S7. The piece of address data is now indicative of the head address of the memory area M31.

The read controller 3b repeats the loop consisting of steps S1 to S7 until the data byte k is transferred to the selector 2. The data byte k is labeled with the end flag bit E of "1", and the answer at step S5 is changed to affirmative. Then, the read controller 3b proceeds to step S8, and changes the flag bit S to zero through the flag signal FG3. The flag bit S indicates that the message "0" is invalid, and does not permit the read controller 3b to transfer the message "0" to the output channel OCH0 twice. Thus, the switching apparatus completes the data transmission of the message "0" from the message memory 1b to the output channel OCH0 through repetition of the loop consisting of steps S1 to S8.

On the other hand, if the flag bit S is zero, the message "0" is invalid, and the answer at step S3 is given negative. Then, the read controller 3b proceeds to step S9. The read controller 3b checks the flag bit I to see whether or not the idling pattern should be transferred to the output channel OCH0. When the flag bit I is "0", the switch buffer 1a stores a data byte to be transferred to the output channel OCH0, and the answer at step S9 is given negative. Then, the read controller 3b makes the switch buffer 1a accessible, and supplies the address signal ADD2 representative of the head address of the memory area M10 to the switch buffer 1a. Concurrently, the read controller 3b changes the control signal CTL1 to a value representative of the switch buffer 1a, and supplies the control signal CTL1 to the selector 2. The switch buffer 1a supplies the input data byte from the memory area M10 to the selector 2, and the selector 2 transfers the data byte to the output channel OCH0 as by step S10.

On the other hand, if the flag bit I is "1", there is not any data byte to be transferred to the output channel OCH0, and the answer at step S9 is given affirmative. The read controller 3b changes the control signal CTL1 to a value representative of the pattern generator (not shown), and supplies the control signal CTL1 to the selector 2. The selector 2 transfers the idling pattern to the output channel OCH0 as by step S11.

Upon execution of one of the steps S7/S8/S10/S11, the read controller 3b returns to step S1, and repeats the program sequence for the data transfer to the output channel OCH0. As described hereinbefore, the above-description is made on the assumption that the data transfer is performed for the output channel OCH0. The read controller 3b also executes the program sequence S1 to S11 for each output channel OCH1–OCHn.

A set of instruction codes represents the program sequence shown in FIG. 5, and is stored in an information storage medium such as, for example, a hard disk incorporated in or associated with the read controller 3b. The set of instruction codes may be supplied to a built-in memory of the read controller 3b through a communication network.

As will be understood from the foregoing description, the read controller 3b is associated with the read control memory 3a, and the control memory 3a stores the flags and the addresses for the data bytes to be transferred to the plural output channels OCH0–OCHn. This feature is desirable, because the message memory 1 is shared between the output channels OCH0–OCHn. This results in the simple memory unit 1. The simple memory unit 1 reduces the production cost of the switching apparatus.

Even though the messages are different in length, the end flag bit E teaches the read controller 3b the final data byte, and the message memory 1b can store variable-length messages.

Although a particular embodiment of the present invention has been shown and described, it will be apparent to those skilled in the art that various changes and modifications may be made without departing from the spirit and scope of the present invention.

For example, when the final data byte is transferred from the message memory 1b to the associated output channel, the read controller 3b may terminate the data transmission by using the flag bit C instead of the flag bit S.

The flag C may indicate the data source to be accessed, i.e., the switch buffer 1a, the message memory 1b or the pattern generator. When the flag C is set to value "1", the switch buffer 1a supplies the data byte to the selector 2. The message memory 1b is indicated by the flag C of "2", and the pattern generator is indicated by the flag C of "3".

One than one byte may be stored in the memory area M20–M2j.

What is claimed is:

1. A switching apparatus for supplying pieces of data information to plural channels defined on a data line through a time division multiplexing, comprising:

a first memory having first memory areas storing first pieces of data information to be selectively transferred to said plural channels, and responsive to a first address signal for selectively outputting said first pieces of data information;

a second memory having second memory areas storing second pieces of data information to be selectively transferred to said plural channels, and responsive to a second address signal for selectively outputting said second pieces of data information;

a selector connected between said first and second memories and said data line, and responsive to a control signal so as to selectively transfer said first pieces of data information and said second pieces of data information to said plural channels;

a channel controller including a third memory having third memory areas associated to said plural channels, respectively, and storing pieces of address information each assigned to one of said first memory areas for storing one of said first pieces of data information to be transferred to associated one of said plural channels or one of said second memory areas for storing one of said second pieces of data information to be transferred to said associated one of said plural channels together with first pieces of flag information each used for controlling the data transfer from said first and second memories to associated one of said plural channels, and a controller connected to said first memory, said second memory, said third memory and said selector, and sequentially accessing said third memory areas for controlling said data transfer from said first and second memories through said selector to said data line with said control signal, said first address signal and said second address signal.

2. The switching apparatus as set forth in claim 1, in which said second memory areas further store second pieces of flag information each representative of an end point of a series of second pieces of data information to be transferred to one of said plural channels, and said controller successively changes the address represented by said second address signal until the second piece of data information at said end point is transferred to said one of said plural channels.

3. The switching apparatus as set forth in claim 1, in which each of said first pieces of flag information indicates one of said first and second memories to be connected through said selector to one of said plural channels, and said controller checks said first pieces of flag information so as to selectively supply said first address signal and said second address signal to said first memory and said second memory.

4. The switching apparatus as set forth in claim 3, in which said each of said first pieces of flag information further indicates a validity of a second piece of data information to be transferred to associated one of said plural channels.

5. The switching apparatus as set forth in claim 4, in which said second memory areas further store second pieces of flag information each representative of an end point of a series of second pieces of data information to be transferred to one of said plural channels, and said controller changes associated one of said first pieces of flag information to invalid when the second piece of data information is transferred from said end point through said selector to said associated one of said plural channels.

6. The switching apparatus as set forth in claim 5, in which the second pieces of data information of said series are stored in the second memory areas assigned a series of addresses, and said controller sequentially changes associated one of said pieces of address information so as to successively indicate the addresses of said series.

7. The switching apparatus as set forth in claim 4, in which said each of said first pieces of flag information further indicates whether or not said data transfer to said associated one of said plural channels is to be synchronous to an external signal.

8. The switching apparatus as set forth in claim 1, in which said controller sequentially accesses said third memory areas at timings when said plural channels selectively becomes connectable to said first and second memories in said time division multiplexing.

9. The switching apparatus as set forth in claim 1, further comprising a pattern generator connected to said selector and generating an idling pattern, wherein each of said first pieces of flag information indicates one of said first memory, said second memory and said pattern generator to be connected through said selector to one of said plural channels, and said controller checks said first pieces of flag information so as to instruct said selector to connect said one of said first memory, said second memory and said pattern generator to said one of said plural channels with said control signal.

10. A method for transferring pieces of data information to plural channels through a time division multiplexing, comprising the steps of:

a) storing first pieces of data information, second pieces of data information and plural combinations of pieces of address information and first pieces of flag information in first memory areas of a first memory, second memory areas of a second memory and third memory areas of a third memory, respectively;

b) deciding a timing to be given for a data transfer to one of said plural channels;

c) checking one of said third memory areas assigned to said one of said plural channels to see whether the first piece of flag information is indicative of a data transfer from said first memory to said one of said plural channels or from said second memory to said one of said plural channels; and d) instructing either first memory or second memory to transfer one of said first pieces of data information or one of said second pieces of data information to said one of said plural channels.

11. The method as set forth in claim 10, in which one of said first pieces of flag information indicates a validity of the second piece of data information to be transferred to said one of said plural channels, and said step c) includes the sub-steps of
- c-1) reading said one of said first pieces of flag information together with associated one of said pieces of address information from said third memory,
- c-2) checking said one of said first pieces of flag information to see whether said second pieces of data information is valid or invalid, and
- c-3) making one of said first and second memories responsive to an address signal representative of said associated one of said pieces of address in formation.

12. The method as set forth in claim 10, in which said one of said first pieces of flag information further indicates an existence of the first piece of data information to be transferred to said one of said plural channels, and an idling pattern is transferred to said one of said plural channels in said step d) when said one of said first pieces of flag information indicates that said first piece of data information and said second piece of data information are absent and invalid, respectively.

13. An information storage medium for storing a set of programmed instructions representative of a method for transferring pieces of data information to plural channels through a time division multiplexing comprising the steps of
- a) storing first pieces of data information, second pieces of data information and plural combinations of pieces of address information and first pieces of flag information in first memory areas of a first memory, second memory areas of a second memory and third memory areas of a third memory, respectively,
- b) deciding a timing to be given for a data transfer to one of said plural channels,
- c) checking one of said third memory areas assigned to said one of said plural channels to see whether the first piece of flag information is indicative of a data transfer from said first memory to said one of said plural channels or from said second memory to said one of said plural channels and
- d) instructing either first memory or second memory to transfer one of said first pieces of data information or one of said second pieces of data information to said one of said plural channels.

* * * * *